United States Patent [19]

Matsumoto

[11] Patent Number: 4,974,694
[45] Date of Patent: Dec. 4, 1990

[54] ACCELERATION SLIP CONTROLLER FOR A VEHICLE

[75] Inventor: Shinichi Matsumoto, Toyota, Japan

[73] Assignee: Toyota Jidosha Kabushiki Kaisha, Aichi, Japan

[21] Appl. No.: 313,454

[22] Filed: Feb. 22, 1989

[30] Foreign Application Priority Data

Feb. 25, 1988 [JP] Japan .................................. 63-42950

[51] Int. Cl.$^5$ ........................ B60K 28/16; F02D 29/02
[52] U.S. Cl. .................................... 180/197; 361/238; 364/426.02
[58] Field of Search ................. 180/197, 233; 361/238; 364/426.02; 303/95, 100, 103

[56] References Cited

U.S. PATENT DOCUMENTS

| | | | |
|---|---|---|---|
| 4,193,642 | 3/1980 | Miller | 361/238 X |
| 4,196,940 | 4/1980 | Jones | 361/238 X |
| 4,344,139 | 8/1982 | Miller et al. | 361/238 X |
| 4,637,487 | 1/1987 | Nakamura et al. | 180/197 |
| 4,722,411 | 2/1988 | Ohashi et al. | 180/197 |
| 4,733,760 | 3/1988 | Inagaki et al. | 180/197 X |
| 4,736,814 | 4/1988 | Yogo et al. | 180/197 |
| 4,739,856 | 4/1988 | Inagaki et al. | 180/197 |
| 4,760,893 | 8/1988 | Sigl et al. | 180/197 |
| 4,811,808 | 3/1989 | Matsumoto et al. | 180/197 |
| 4,823,269 | 4/1989 | Fujioka et al. | 180/197 X |
| 4,866,623 | 9/1989 | Ise et al. | 364/426.3 |

FOREIGN PATENT DOCUMENTS

| | | |
|---|---|---|
| 3206694 | 1/1983 | Fed. Rep. of Germany . |
| 360376A1 | 8/1986 | Fed. Rep. of Germany . |
| 60-128057 | 7/1985 | Japan . |
| 61-1543 | 1/1986 | Japan . |
| 61-85248 | 4/1986 | Japan . |
| 61-182434 | 8/1986 | Japan . |
| 61-283736 | 12/1986 | Japan . |
| 61-286542 | 12/1986 | Japan . |
| 62-7954 | 1/1987 | Japan . |
| 62-149545 | 7/1987 | Japan . |

Primary Examiner—Mitchell J. Hill
Attorney, Agent, or Firm—Oliff & Berridge

[57] ABSTRACT

This controller detects acceleration slippage of driven wheels, calculates the controlled variable of the driven wheels based on the deviation of the actual driven-wheel revolution speed from the target driven-wheel revolution speed, starts controlling the driven-wheel revolution speed in response to the calculated, controlled variable, and corrects the calculated, controlled variable to control the driven-wheel slip mount out of a predetermined range due to excessive control of the driven-wheel revolution speed, thus making the actual driven-wheel revolution speed quickly approximate the target driven-wheel revolution speed.

4 Claims, 10 Drawing Sheets

FIG. 8

| THROTTLE OPENING θ[%] | ENGINE SPEED NE ×100rpm | | | | | |
|---|---|---|---|---|---|---|
| | | 0 | 4 | 8 | 12 | 16 |
| | 0 | 1 | 1 | 1.2 | 1.4 | 1.6 |
| | 5 | 1.4 | 1.4 | 1.3 | 1.3 | 1.4 |
| | 10 | 2 | 2.1 | 2.2 | 2 | 1.8 |
| | 15 | 4 | 4 | 4 | 2.8 | 3 |
| | 20 | 4 | 4 | 4 | 4 | 3.5 |
| | 25 | 4 | 4.5 | 5 | -- | -- |

FIG. 9A-1
| SLIP RATE S | 0.0 | 3.2 | 6.4 | 9.6 | 12.8 | 16.0 | 19.2 | 22.4 | 25.6 | 28.8 | 32.0 | 35.2 | 38.4 | 41.6 | 44.8 |
|---|---|---|---|---|---|---|---|---|---|---|---|---|---|---|---|
| K2 | 1.5 | 1.5 | 1.0 | 1.0 | 1.0 | 1.0 | 1.05 | 1.1 | 1.15 | 1.2 | 1.25 | 1.3 | 1.35 | 1.4 | 1.45 |
FIG. 9A-2
| DEVIATION SX | 0.0 | 0.7 | 1.4 | 2.1 | 2.8 | 3.5 | 4.2 | 4.9 | 5.6 | 6.3 | 7.0 | 7.7 | 8.4 | 9.1 | 9.8 |
|---|---|---|---|---|---|---|---|---|---|---|---|---|---|---|---|
| K2 | 1.5 | 1.5 | 1.0 | 1.0 | 1.0 | 1.0 | 1.0 | 1.0 | 1.06 | 1.1 | 1.2 | 1.25 | 1.3 | 1.35 | 1.4 |
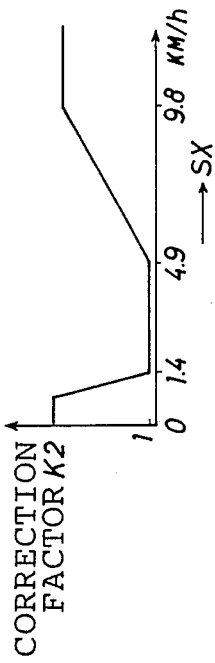
FIG. 9B-1
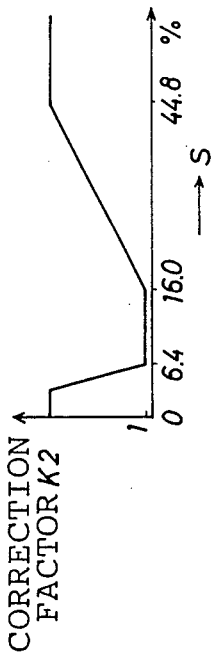
FIG. 9B-2

ACCELERATION SLIP CONTROLLER FOR A VEHICLE

BACKGROUND OF THE INVENTION

This invention relates to an acceleration slip controller for controlling slippage that occurs between driven wheels and a road surface when a vehicle accelerates.

One such prior-art acceleration slip controller is shown in Japan Published Unexamined Patent Application Nos. 61-286542 and 62-7954. These controllers detect slippage that occurs between driven wheels and the road surface when the vehicle accelerates, based on the acceleration rate or the revolution speed of the driven wheels and the vehicle speed. In response to detected slippage, the controllers control the revolution speed of the driven wheels until slippage is eliminated by controlling a brake, or by opening or closing a throttle valve of an engine, thus improving the accelerating ability of the vehicle.

Another such controller controls the revolution speed of the driven wheels using a variable X, e.g., the speed of increasing or decreasing a brake oil pressure, the speed of opening or closing the throttle valve, etc. The variable X is determined based on the deviation $\Delta V$ of the actual driven-wheel revolution speed from a target driven-wheel revolution speed calculated, for example, by using the following formula:

$$X = a \cdot \Delta V + b \cdot \Delta \dot{V} \tag{1}$$

In the formula (1), a and b are factors. The target driven-wheel revolution speed is determined from the vehicle speed. With the differential and proportional control using the variable X, the actual driven-wheel revolution speed can approximate the target driven-wheel revolution speed quickly after the control starts.

The acceleration slip control, using the controlled variable X, can make the actual driven-wheel revolution speed approximate the target driven-wheel revolution speed more quickly, than a control where the detected driven-wheel revolution speed exceeds the target driven-wheel revolution speed and the driven-wheel speed is controlled by using a predetermined controlled value: for example, by increasing or decreasing the brake oil pressure at a predetermined rate, by opening or closing the throttle valve at a predetermined speed, etc. The acceleration slip control using the controlled variable X can control friction between the driven wheels and the road surface, thus improving the acceleration ability of the vehicle. However, if a driven-wheel slip rate leaves the predetermined range after the acceleration slip control starts or after the driven-wheel revolution speed drops during the control, the actual driven-wheel revolution speed slowly approximates the target driven-wheel revolution speed.

Specifically, as shown in FIG. 2, the target driven-wheel revolution speed is determined using the $\mu$-S curve ($\mu$: a friction factor for tires on a road surface, S: slippage rate) and a lateral drag on the tires, so that the driven-wheel slip rate S is about 5 to 10%. Regions A, B and C in FIG. 2 correspond to ranges A, B and C in FIG. 10. The driven-wheel revolution speed is controlled to stay in range B in FIG. 10. In the corresponding range B in FIG. 2, as the slippage rate S increases, the friction factor $\mu$ gradually increases. A controlled variable for the acceleration slip control is calculated based on the deviation of the actual driven-wheel speed from the target driven-wheel speed, for example, using the mentioned formula (1). In the formula (1) the factors a and b are predetermined so that the actual driven-wheel speed in the range B can quickly approximate the target driven-wheel speed.

With the acceleration slip control, the driven-wheel speed in the range B can quickly approximate the target driven-wheel speed.

The acceleration slip control starts, when the actual driven-wheel speed reaches or exceeds a control start point which is set greater than the target driven-wheel speed; that is, when the slippage rate S reaches or exceeds a point K in FIG. 2, or when the actual driven-wheel speed exceeds the target driven-wheel speed continuously for a predetermined time. When the slippage rate S reaches the range C in FIG. 2, the acceleration slip control starts. The acceleration slip control is thus prevented from starting when the driven-wheel speed temporarily increases; for example, when the driven wheels run on a bumpy road surface.

In the range C in FIG. 2, as the slippage rate S increases, the friction factor $\mu$ decreases. When the acceleration slip control starts, the slippage rate S quickly increases. Since the controlled variable is calculated using the formula that is established to efficiently control the driven-wheel speed in the range B, the calculated, controlled variable is insufficient for controlling the driven-wheel speed in the range C. The actual driven-wheel speed in the range C slowly approximates the target driven-wheel speed. As a lateral drag decreases, the stability of the running vehicle decreases.

After the acceleration slip control starts, the driven-wheel speed may drop excessively, then the slippage rate S enters the range A in FIG. 2. In the range A, as the slippage rate S varies, the friction factor $\mu$ changes greatly. To increase the dropped slippage rate S up to the range B, the driven wheels require much driving force. However, since the controlled variable is determined so that efficient controllability of the slippage rate S in the range B can be obtained, the calculated, controlled variable is insufficient for increasing the slippage rate S from the range A to the range B. The driven-wheel speed in the range A requires time to approximate the target driven-wheel speed. The accelerating ability of the vehicle drops accordingly.

SUMMARY OF THE INVENTION

An object of the invention is, therefore, to make a driven-wheel speed quickly approximate a target driven-wheel speed, irrespective of slippage of the driven wheels.

This object is achieved by the present invention as set forth below. As shown in FIG. 1, the invention provides an acceleration slip controller comprising a driven-wheel speed detection means M2 for detecting a revolution speed of driven wheels M1; a vehicle speed detection means M3 for detecting a vehicle speed; a target driven-wheel speed calculation means M4 for calculating a target revolution speed for the driven wheels M1 based on the detected vehicle speed; a controlled variable calculation means M6 for detecting acceleration slippage of the driven wheels M1 based on the detected revolution speed of the driven wheels M1, and for calculating a controlled variable for the driven wheels M1 based on a deviation of the revolution speed of the driven wheels M1 from the target revolution speed; a slip control means M5 for controlling the revolution speed of the driven wheels M1 using the controlled variable of the driven wheels until the acceleration slippage disappears; a slip amount detection means M7 for detecting a slippage rate on the driven wheels M1 based on the revolution speed of the driven wheels M1 and the vehicle speed; and a controlled variable correction means M8 for correcting the controlled variable for the driven wheels M1, in relation to a deviation of the slippage rate from a target slippage rate when the slippage rate is outside a predetermined range.

The target driven-wheel speed calculation means M4 determines the target driven-wheel speed, which is the driven-wheel revolution speed at which the friction force between the driven wheel and road, surface becomes maximum when the vehicle accelerates. The target driven-wheel speed can be calculated, for example, by multiplying the vehicle speed by a predetermined factor equal to or greater than one so that the driven-wheel slippage rate can be 5 to 10%, or by adding a predetermined factor to the vehicle speed.

The slip control means M5 controls the driven-wheel revolution directly with a brake, or indirectly by controlling the opening of a throttle valve, ignition timing, fuel injection volume, etc., to regulate engine output torque. The driven-wheel revolution can be controlled by combining such direct and indirect methods.

The controlled variable calculation means M6 calculates the controlled variable of the driven wheel M1, e.g., the speed for increasing or decreasing a brake oil pressure, or the speed for opening or closing the throttle valve, based on the deviation of the actual driven-wheel speed from the target driven-wheel speed. For example, the controlled variable X of the driven wheel M1 is calculated based on the deviation $V = (VS - VR)$ of the actual driven-wheel speed VR from the target driven-wheel speed VS and a change rate $\Delta V$ of the deviation $\Delta V$.

As shown in FIG. 3, even when the speed at which the throttle valve opens or closes is the same, the output torque of the engine, i.e., the driving torque of the driven wheel, varies with an engine speed NE and a throttle opening $\theta$. When the revolution of the driven wheel M1 is controlled by opening or closing a throttle valve, the calculated, controlled variable, i.e., the speed at which the throttle valve opens or closes, should be corrected with the engine speed NE and the throttle opening $\theta$.

The slip amount detection means M7 detects the slippage of the driven wheel based on the driven-wheel speed VR and a vehicle speed VF. For example, slippage of the driven wheel is detected by calculating the slippage rate S of the driven wheel using the following formula (2), or by calculating the difference between the driven-wheel speed VR and the vehicle speed VF.

$$S = (VR - VF)/VR \quad (2)$$

BRIEF DESCRIPTION OF THE DRAWINGS

The invention may be best understood by referring to the following description of the preferred embodiment and the drawings in which:

FIG. 8 is a part of a table for determining a correction factor K1 that is used to calculate a controlled speed of a sub-throttle valve;

FIGS. 9A-1 and 9A-2 are tables for determining a correction factor K2 which is used to correct the calculated, controlled speed of the sub-throttle valve;

FIG. 9B-1 and 9B-2 are graphs showing the characteristics of the correction factor K2.

DESCRIPTION OF THE PREFERRED EMBODIMENT

Figure 1:
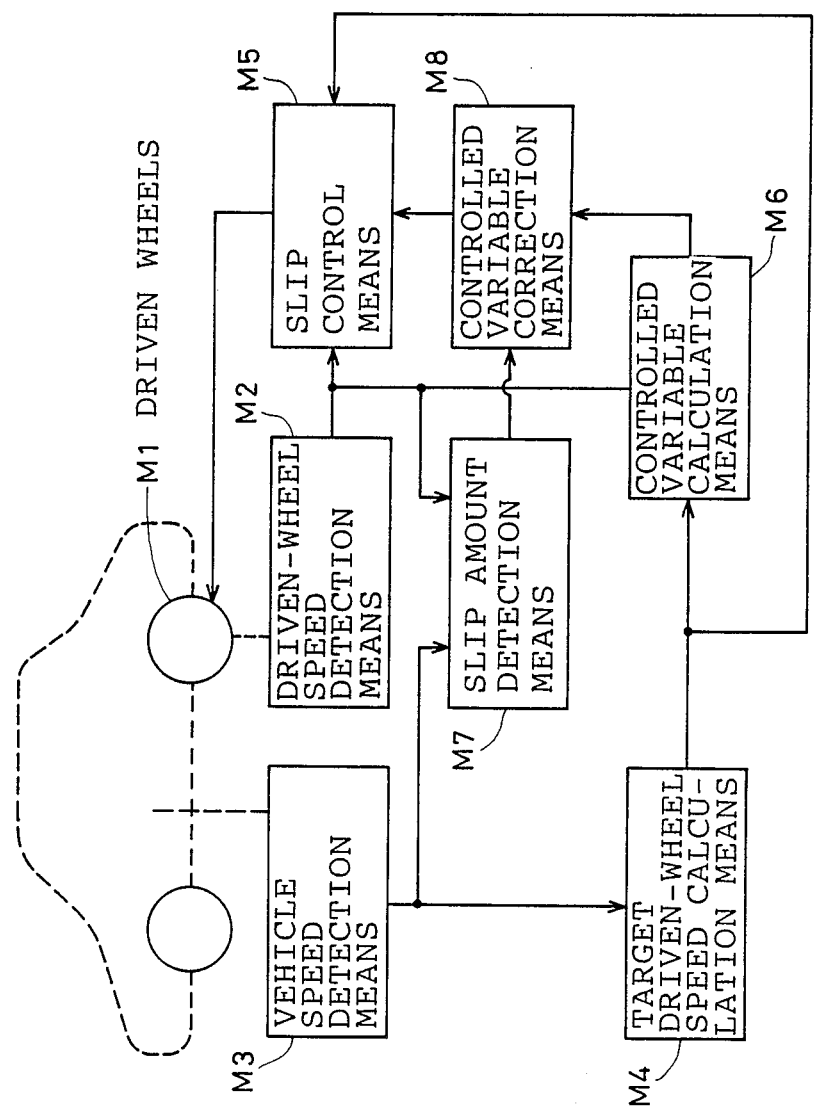
FIG. 1 is a block diagram showing a basic structure of the invention.

Hereinafter, an embodiment of the present invention will be described referring to the drawings.

The embodiment is a rear wheel driven, front gasoline engine vehicle equipped with the acceleration slip control system of this invention.

Figure 4:
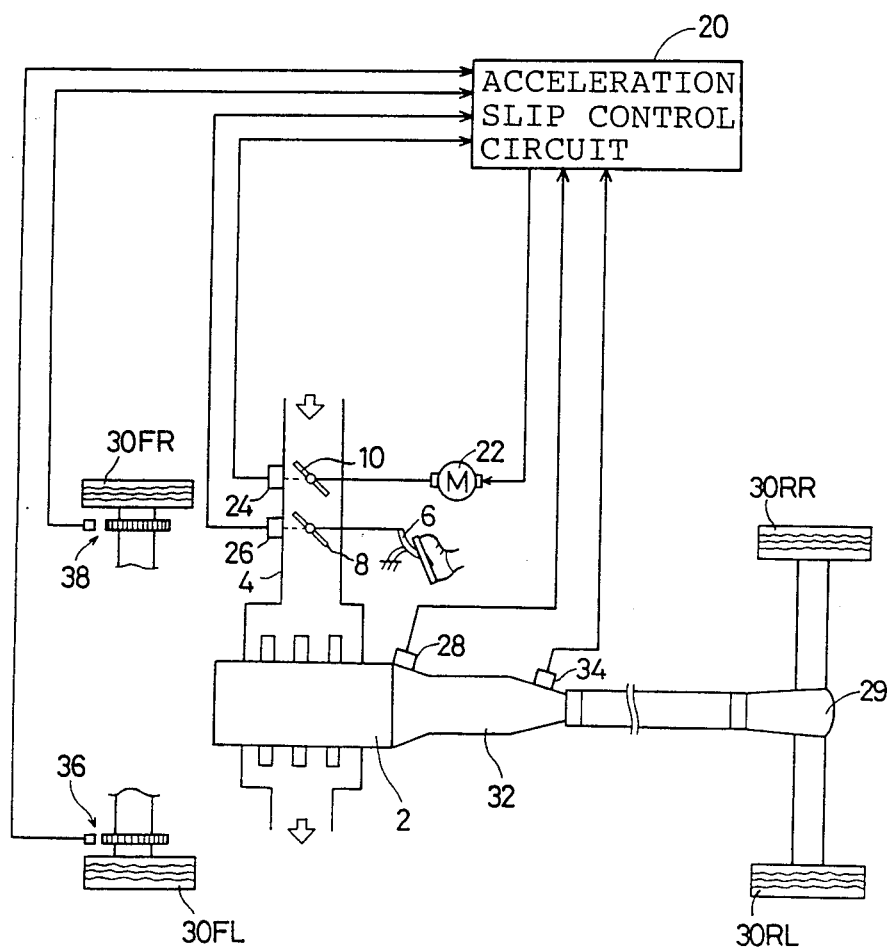
FIG. 4 is a circuit diagram of an acceleration slip control circuit and its control system for the embodiment.

As shown in FIG. 4, in an intake pipe 4 of an engine 2, a main throttle valve 8, connected to an acceleration pedal 6, opens and closes, and a sub-throttle valve 10, separated from the main throttle valve 8, opens and closes to control an acceleration slippage. The sub-throttle valve 10 is usually closed. When the acceleration slippage occurs, an acceleration slip control circuit 20 transmits a valve control signal to a sub-throttle motor 22 to open or close the sub-throttle valve 10. The sub-throttle valve 10 and the main throttle valve 8 are provided with a sub-throttle opening sensor 24 and a main throttle opening sensor 26, respectively. The acceleration slip control circuit 20 detects an opening of the throttle valves 10 and 8 with the sensors 24 and 26, and opens or closes the sub-throttle valve 10.

An engine speed sensor 28 detects the revolution speed of the engine 2. A transmission 32 transmits the revolution from the engine 2 via a differential gear 29 to the left and the right rear driven wheels 30RL and 30RR.

On the output shaft of the transmission 32 is a driven-wheel speed sensor 34 for detecting an actual driven-wheel speed VR. Left and right non-driven wheels 30FL and 30FR are provided with left and right non-driven wheel speed sensors 36 and 38, respectively, for detecting the revolution speed of the wheels 30FL and 30FR. The sensors 24, 26, 28, 34, 36 and 38 transmit the detection signals to the acceleration slip control circuit 20.

Figure 5:
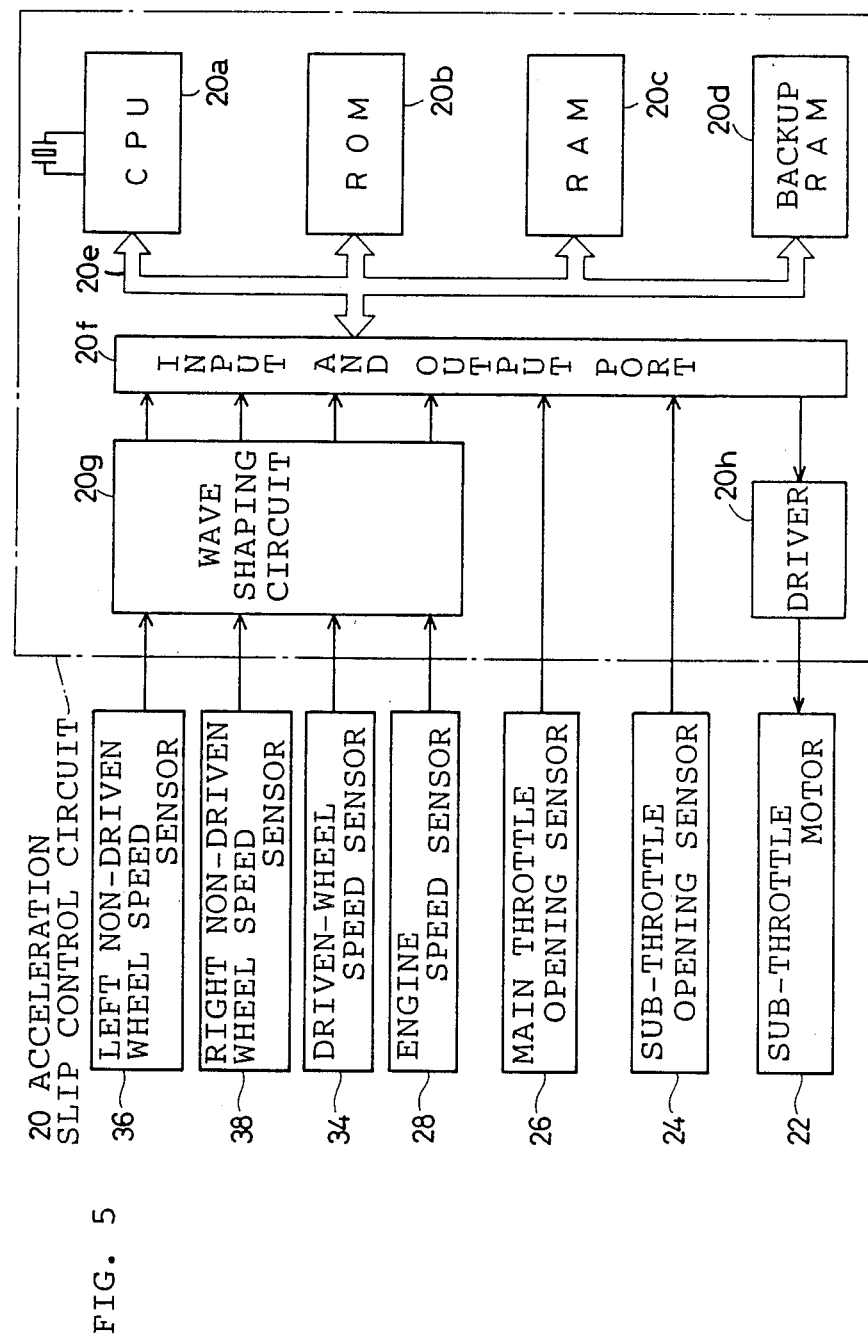
FIG. 5 is an electrical block diagram of the acceleration slip control circuit for the embodiment.

The structure of the acceleration slip control circuit 20 is now explained with FIG. 5. The acceleration slip control circuit 20 is an arithmetic logic unit including CPU 20a, ROM 20b, RAM 20c and backup RAM 20d. The CPU 20a, the ROM 20b, the RAM 20c and the backup RAM 20d connect via a common bus 20e with an input and output port 20f to receive signals from the sensors 24, 26, 28, 34, 36 and 38 and to transmit signals to the sub-throttle motor 22.

The sub-throttle opening sensor 24 and the main throttle opening sensor 26 transmit detection signals directly to the input and output port 20f. The engine speed sensor 28, the driven-wheel speed sensor 34 and the left and right non-driven wheel speed sensors 36 and 38 transmit detection signals via a wave shaping circuit 20g to the input and output port 20f. Depending on the detection signals, the CPU 20a transmits a control signal through the input and output port 20f and the driver 20h to the sub-throttle motor 22, actuating the sub-throttle valve 10.

The above-constituted acceleration slip control circuit 20 detects acceleration slippage of the driven wheels 30RL and 30RR based on the detection signals transmitted from the wheel speed sensors 34, 36 and 38. When detecting acceleration slippage, the acceleration slip control circuit 20 opens or closes the sub-throttle valve 10 until the revolution speed of the driven wheels 30RL and 30RR reaches a target revolution speed.

Figure 6:
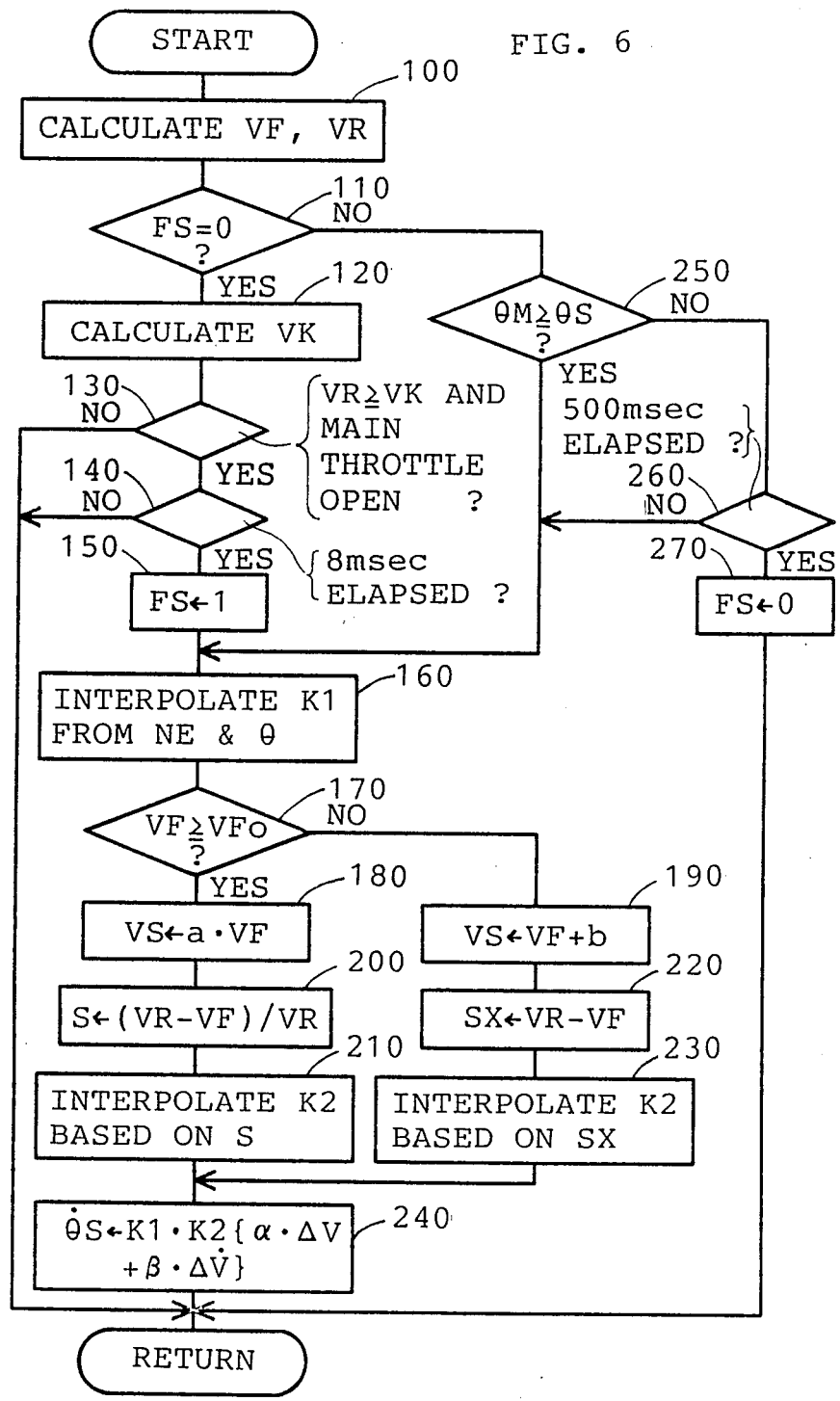
FIG. 6 is a flowchart of a sub-throttle controlled speed calculation routine in the acceleration slip control circuit.
Figure 7:
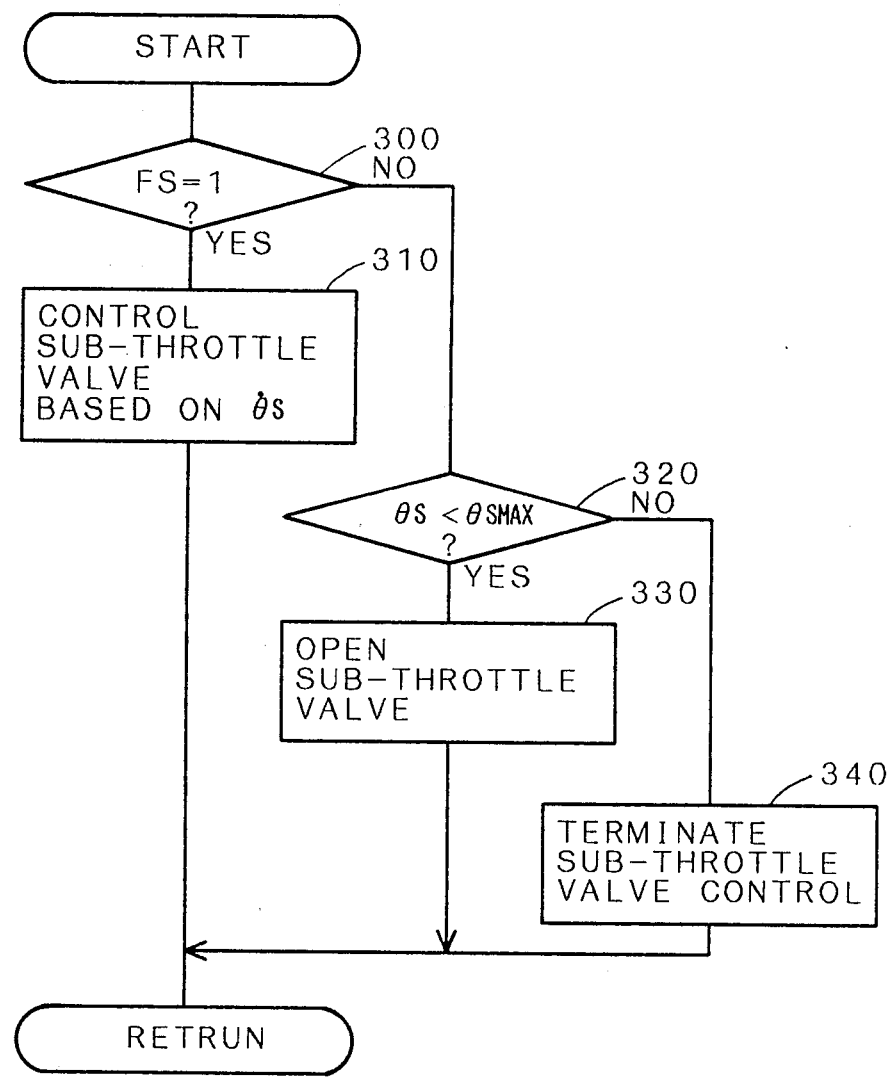
FIG. 7 is a flowchart of a sub-throttle motor actuation routine for the acceleration slip control circuit.

The processing executed in the acceleration slip control circuit 20 are now explained using the flowcharts of FIGS. 6 and 7.

In the flowchart of FIG. 6, when acceleration slippage of the driven wheels is detected, a controlled speed $\theta s$ of the sub-throttle valve 10 is calculated to control the opening of the valve 10 and eliminate the acceleration slippage. The controlled speed $\theta s$ is repeatedly calculated at a predetermined interval.

When the routine of FIG. 6 starts, step 100 calculates the vehicle speed VF and the actual driven-wheel speed VR, respectively, based on the detection signals transmitted from the left and the right non-driven wheel speed sensors 36 and 38, and the driven-wheel speed sensor 34. The vehicle speed VF is the average or the greater value of the speeds detected by the left and the right non-driven speed sensors 36 and 38.

Subsequently, step 110 determines whether a flag FS is equal to zero or not, that is, whether acceleration slippage is being controlled or not. The flag FS indicates the execution of the acceleration slip control. When it is determined that the flag FS is zero and the acceleration slippage is not controlled, the process goes to step 120.

The step 120 calculates a reference driven-wheel speed VK based on the vehicle speed VF calculated at the step 100 to determine whether to control the acceleration slippage or not. Acceleration slippage of the driven wheels is detected from the driven-wheel speed. The reference driven-wheel speed VK is set greater than a target driven-wheel speed (described later) so that the acceleration slippage can be accurately detected. When the vehicle speed VF is lower than a predetermined speed, the reference driven-wheel speed VK is calculated by adding a predetermined reference value bo to the vehicle speed VF. When the vehicle speed VF exceeds the predetermined speed, the reference driven-wheel speed VK is calculated by multiplying the vehicle speed VF by a predetermined reference value ao.

Then, step 130 determines whether the condition to start the acceleration slip control exists. Specifically, it is determined whether the actual driven-wheel speed VR equals or exceeds the reference driven-wheel speed VK and whether the main throttle valve 8 is open. If this condition is not satisfied, the process ends. Even if the condition is satisfied at step 130, the acceleration slip control is suspended until a predetermined time, e.g., 8 msec elapses at step 140. The delay in processing at step 140 is introduced because the slip control should not start when the driven wheels 30RL and 30RR are coasting through a sporadic dip or irregularity of the road surface.

When the conditions for the acceleration slip control remain after the predetermined time elapses at step 140, step 150 sets the flag FS to one, and step 160 interpolates the correction factor K1 from a table in FIG. 8 mapping the speed NE of the engine 2 detected by the engine speed sensor 28 to the throttle opening $\theta$. An actual sub-throttle opening $\theta S$ detected by the sub-throttle opening sensor 24 is used as the throttle opening $\theta$. The correction factor K1 is used to calculate the controlled speed $\theta s$ of the sub-throttle valve 10 in a process described later. The correction factor K1 is introduced to determine the controlled speed $\theta s$ of the sub-throttle valve 10 so that the output torque of the engine 2 can steadily increase or decrease according to the deviation of the actual driven-wheel speed from the target driven-wheel speed. The output torque of the engine 2 determines the revolution torque of the driven wheels.

Subsequently, step 170 determines whether the vehicle speed VF calculated at step 100 is equal to or greater than a reference vehicle speed VFo. When the vehicle speed VF is equal to or greater than the reference vehicle speed VFo, the process goes to step 180. When the vehicle speed VF is lower than the reference vehicle speed VFo, the process goes to step 190. Step 180 calculates a target driven-wheel speed VS by multiplying the vehicle speed VF by a predetermined reference value a, and step 190 calculates VS by adding a predetermined reference value b to VF. When the target driven-wheel speed VS is obtained, the target slip rate of the driven wheels can be about 5 to 10%.

The reference values a and b used for determining the target driven-wheel speed VS are smaller than the reference values ao and bo used for determining the reference driven-wheel speed VK.

After step 180 calculates the target driven-wheel speed VS, step 200 calculates a slip rate S for the driven wheels based on the actual driven-wheel speed VR and the vehicle speed VF calculated at step 100, using the mentioned formula (2). Based on the slip rate S, step 210 interpolates a correction factor K2 as shown in FIG. 9B-1 using a table in FIG. 9A-1.

Figure 2:
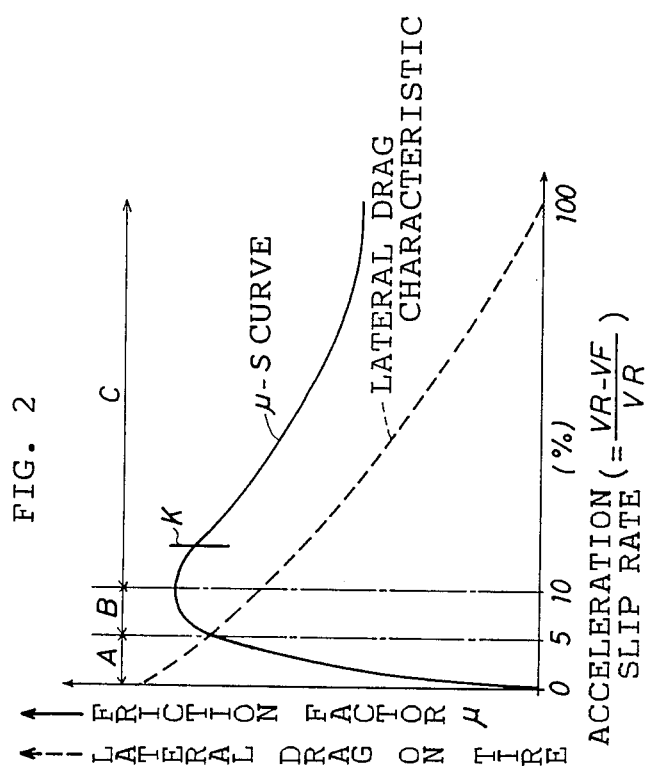
FIG. 2 is a graph showing the relationship between a slippage rate S when a vehicle accelerates and a friction factor $\mu$ and a lateral drag on tires.
Figure 3:
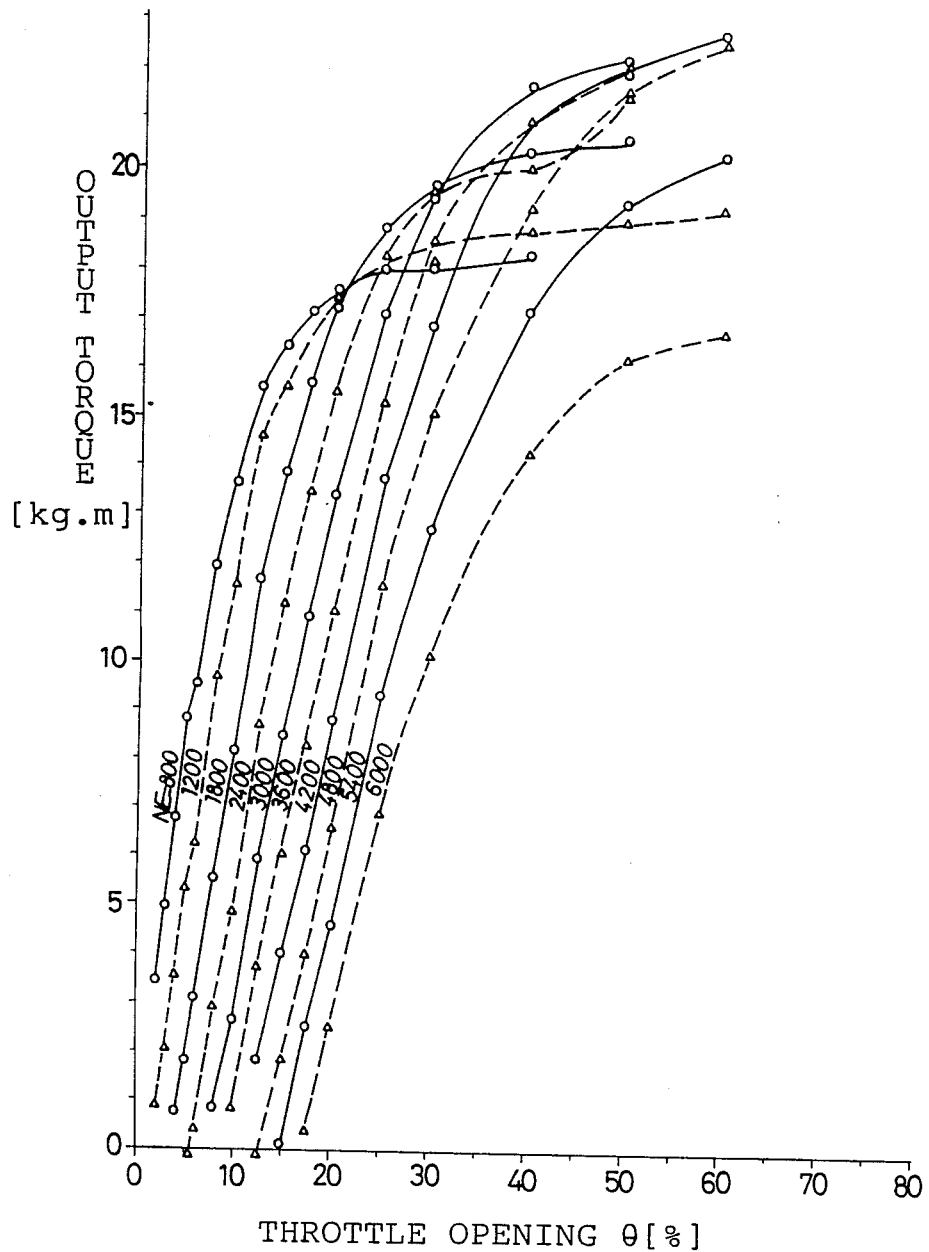
FIG. 3 is a graph showing the relationship between a throttle valve opening $\theta$ and an engine output torque.

After step 190 calculates the target driven-wheel speed VS, step 220 calculates a difference SX between the actual driven-wheel speed VR and the vehicle speed VF. Based on the difference SX, step 230 interpolates a correction factor K2 as shown in FIG. 9B-2 using a table in FIG. 9A-2.

Like the correction factor K1, the correction factor K2 is used to calculate the controlled speed $\theta s$ of the sub-throttle valve 10. Steps 180 and 190 determine the target driven-wheel speed VS. The next steps 200 and 220 detect slippage of the driven wheels. Based on the detected deviation from the target slippage of the driven wheels, steps 210 and 230 calculate the correction factor K2.

After steps 210 and 230 calculate the correction factor K2, step 240 calculates the controlled speed (opening and closing speed) $\theta s$ of the sub-throttle valve 10 using formula (3) below. The formula uses as parameters the calculated correction factors K1 and K2, the deviation $\Delta V$ of the actual driven-wheel speed VR from the target driven-wheel speed VS and its change rate $\Delta \dot{V}$.

$$\theta s = K1 \cdot K2 \{\alpha \cdot \Delta V + \beta \cdot \Delta \dot{V}\} \tag{3}$$

Specifically, in formula (3), the portion ($\alpha \cdot \Delta V + \beta \cdot \Delta \dot{V}$) calculates controlled revolution speed of the driven wheels corresponding to the deviation $\Delta V$ of the actual driven-wheel speed VR from the target driven-wheel speed VS ($\Delta V = VS - VR$). The correction factor K1 converts the calculated revolution speed into the controlled speed of the sub-throttle valve 10. The correction factor K2 further corrects the controlled speed such that the slippage of the driven wheels is great enough to deviate from the target slip condition. The formula (3) thus determines the controlled speed $\theta s$ of the sub-throttle valve 10.

Alternatively, when the flag FS is not equal to zero, that is, acceleration slippage is under control, the process goes to step 250 where it is determined a main throttle opening $\theta M$ is equal to or greater than a sub-throttle opening $\theta S$. If the result at step 250 is yes, the process goes to step 160. When the main throttle opening $\theta M$ is less than the sub-throttle opening $\theta S$, step 260 determines whether a predetermined time, e.g., 500 msec has elapsed.

When the condition, $\theta M < \theta S$ remains for the predetermined time at the step 260, it is determined that acceleration slippage will not occur with the driven wheels any more. Finally, step 270 resets the flag FS to zero. If the result at the step 260 is negative, the proceeding goes to step 160.

As shown in the flowchart of FIG. 7, the sub-throttle motor 22 is repeatedly actuated to rotate at the speed corresponding to the sub-throttle controlled speed $\theta s$ calculated in the process shown in FIG. 6, thus controlling the sub throttle valve 10.

When the flag FS is one at step 300, that is, the acceleration slippage is being controlled, the process goes to step 310, which controls the sub-throttle valve 10 by controlled speed $\theta s$ of the sub-throttle valve 10.

On the other hand, when step 300 determines the flag FS is zero, the process goes to step 320 where it is determined whether the actual sub-throttle opening $\theta S$ is less than a maximum sub-throttle opening $\theta SMAX$, that is, whether the sub-throttle valve 10 is fully open or not. When, at step 320, the actual sub-throttle opening $\theta S$ is less than the maximum opening $\theta SMAX$, that is, the sub-throttle valve 10 is not fully open, step 330 actuates the sub-throttle motor 22 and fully opens the sub-throttle valve 10. When at step 320 the actual sub-throttle opening $\theta S$ is equal to or greater than the maximum sub-throttle opening $\theta SMAX$, that is, the sub-throttle valve 10 is fully open, the process goes to step 340 where the sub-throttle motor 22 stops, terminating the sub-throttle valve control.

In this invention, the controlled speed $\theta s$ of the sub-throttle valve 10 is calculated using the correction factor K1 and the deviation $\Delta V$ of the actual driven-wheel speed VR from the target driven-wheel speed VS. The correction factor K2 corrects the calculated, controlled speed $\theta s$ to a greater value such that slippage of the driven wheels deviates from the target slip condition.

Figure 10:
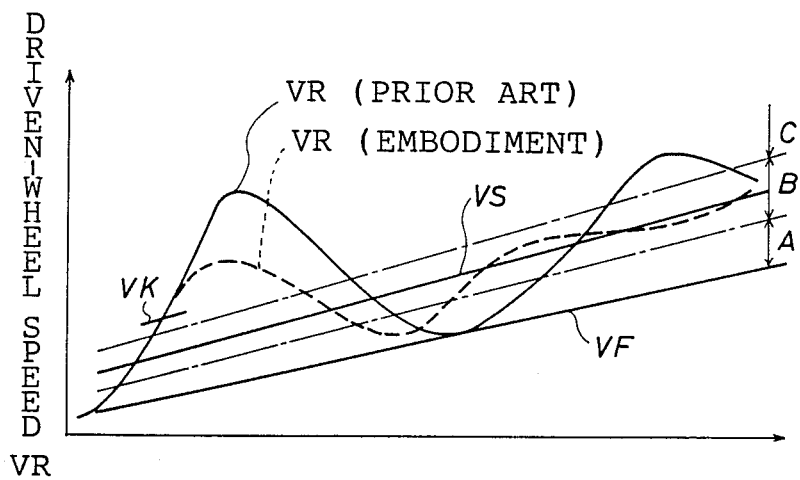
FIG. 10 is a timing chart where an actual driven-wheel speed converges on a target driven-wheel speed.

As shown in FIG. 2, the $\mu$-s curve is substantially maximized, with the slope of the $\mu$-s curve greater than or equal to zero, in a predetermined range B. While the acceleration slippage is within range B, the controlled speed $\Theta s$ of the sub-throttle valve 10 can quickly eliminate slip. Therefore, the correction factor K2 does not eliminate slip. Therefore, the correction factor K2 does not correct the controlled speed $\Theta s$ within range B, as K2=1 in that range as shown in table 9A-1. However, K2 corrects $\Theta s$ when the slippage rate is outside the predetermined range of the slippage rates B. Thus, for example, when the driven-wheel speed increases excessively and an acceleration slip rate is in a slip range C at the beginning of the acceleration slip control, the controlled speed $\theta s$ is corrected to a greater value, thus quickly decelerating the revolution of the driven wheels. On the other hand, when the revolution speed of the driven wheels is suppressed and the acceleration slip rate is in a slip range A in FIG. 2, the controlled speed $\theta s$ of the sub-throttle valve 10 is corrected to a greater value, thus quickly accelerating the revolution of the driven wheels. As shown by the interrupted line in FIG. 10, when the correction factor K2 correctly increases the calculated, controlled speed of the sub-throttle valve, the actual driven-wheel speed can converge to the target driven-wheel speed VS faster as compared with the driven-wheel speed under the acceleration slip control without the correction of the controlled speed using the correction factor K2. Regions A, B and C in FIG. 10 correspond to the slip ranges A, B and C in FIG. 2.

This is only one possible embodiment of the invention claimed below. This embodiment is only an illustration of the claims, and in no way restrict the scope of the claims.

We claim:

1. An acceleration slip controller for controlling slip between a driven wheel of a vehicle and a road surface, comprising:
    a driven-wheel detection means for detecting a revolution speed of the driven wheel;
    a vehicle speed detection means for detecting a vehicle speed of the vehicle;
    a target driven-wheel speed calculation means for calculating a target driven-wheel speed based on the detected vehicle speed;
    a controlled variable calculation means for detecting acceleration slippage of the driven wheel based on the detected revolution speed of the driven wheel, and for calculating a controlled variable for the driven wheel based on a deviation of the revolution speed of the driven wheel from the target driven-wheel speed;
    a slip control means for controlling the revolution speed of the driven wheel using the controlled variable of the driven wheel such that the revolution speed of the driven wheel approximates the target driven-wheel speed;
    a slip amount detection means for detecting a slippage rate on the driven wheel based on the revolution speed of the driven wheel and the vehicle speed; and
    a controlled variable correction means for calculating a correction factor based on a deviation of the slippage rate from a target slippage rate and for correcting the controlled variable with the correction factor when the slippage rate is outside a predetermined range.

2. An acceleration controller according to claim 1 where the controlled variable correction means includes means for calculating a correction factor that is equal to or greater than one, and the controlled variable correction means corrects the controlled variable by multiplying the controlled variable by correction factors that are greater than one.

3. An acceleration controller according to claim 2 where the predetermined range of slippage rate is between 5% and 10%, where the slippage rate is a difference between the revolution speed of the driven wheel and the vehicle speed divided by the revolution speed of the driven wheel.

4. An acceleration controller according to claim 3 where the controlled variable correction means includes means for correcting the controlled variable based upon the slippage rate when the vehicle speed is equal to or greater than a predetermined vehicle speed, and based upon the difference between the revolution speed of the driven wheel and the vehicle speed when the vehicle speed is less than the predetermined vehicle speed.

* * * * *

UNITED STATES PATENT AND TRADEMARK OFFICE
CERTIFICATE OF CORRECTION

PATENT NO. : 4,974,694

DATED : December 4, 1990

INVENTOR(S) : SHINICHI MATSUMOTO

It is certified that error appears in the above-identified patent and that said Letters Patent is hereby corrected as shown below:

```
Title page, Foreign Patent Documents, line 2,
    change "360376A1" to --3603765A1--.
```

Signed and Sealed this

Fifth Day of May, 1992

*Attest:*

DOUGLAS B. COMER

*Attesting Officer*     *Acting Commissioner of Patents and Trademarks*